Nov. 10, 1931.  W. D. CLARK  1,831,229
WATER BICYCLE
Filed Feb. 2, 1931
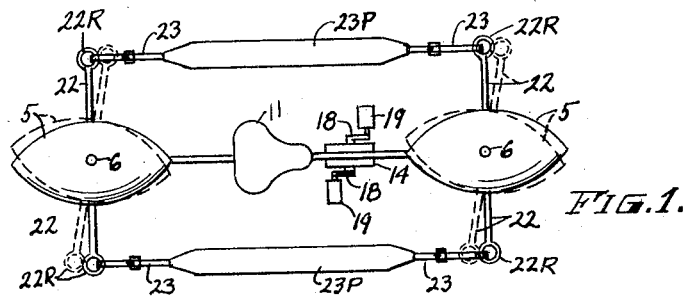
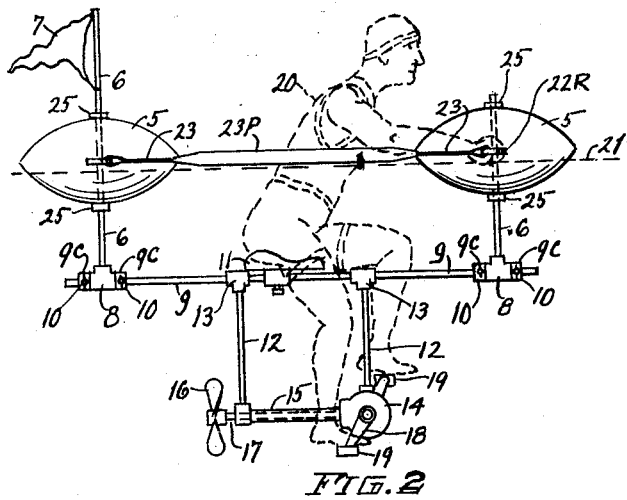
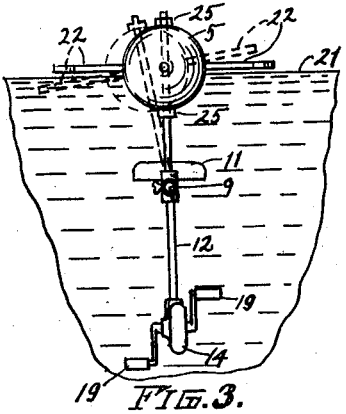
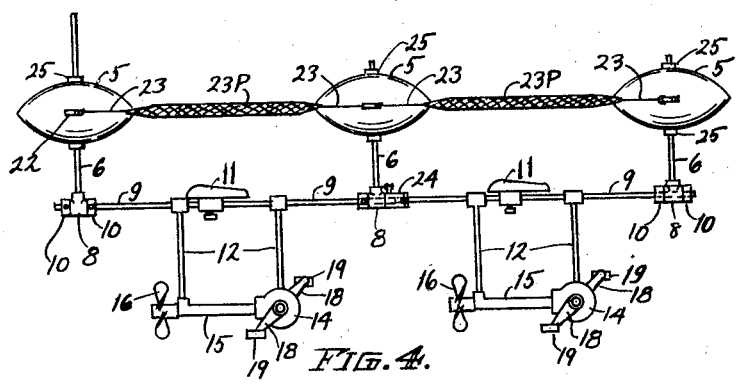
INVENTOR.
William D. Clark
BY
David E. Carlsen
ATTORNEY.

Patented Nov. 10, 1931

1,831,229

UNITED STATES PATENT OFFICE

WILLIAM D. CLARK, OF ST. PAUL, MINNESOTA

WATER BICYCLE

Application filed February 2, 1931. Serial No. 512,829.

This invention relates to improvements in swimming devices and more particularly to a so-called water bicycle mechanically propelled by the user of the device.

The main object of the invention is to provide a practical water bicycle which is made collapsible and consists of a minimum number of parts so arranged and assembled that it is readily carried in a grip or the like and can be easily and quickly set up for use at bathing beaches or swimming pools. By duplication of certain parts and a small number of extra pieces a tandem apparatus may be readily provided. Other objects include an assembled water bicycle which has new and novel steering means and floats arranged in its frame in such a manner as to provide maximum stability for the rider and easy manipulation.

In the accompanying drawings,—

Fig. 1 is a top or plan view of my improved water bicycle, and Fig. 2 is a side elevation of Fig. 1 and showing additionally an operator, in dotted lines, manipulating the device.

Fig. 3 is a front elevation of the device.

Fig. 4 is a side elevation of the water bicycle of tandem type, for two riders.

Referring to the drawings by reference numerals the type of my device adapted for use by one person only, as shown in Figs. 1, 2 and 3, will first be described, then the tandem type, as Fig. 4, which is merely an enlarged or extended form of the water bicycle and which may be further enlarged for three or more riders.

Parts 5 are a pair of elongated, identical floats arranged in spaced alined relation to each other and retained thus by vertical arms 6 passed one through each float and projecting above it.

The rear arm 6 may project upwardly far enough to carry a banner 7 (Fig. 2). The lower ends of arms 6 are preferably removably securable to a pipe T 8. 9 is a horizontal main frame bar removably and pivotally engaged in the members 8, being retained by suitable means such as collars 9C on the bar and secured by means of thumb screws 10 or equivalent means.

Part 11 is a rider's seat, preferably of the type used on a bicycle and suitably fixed to bar 9 intermediate its ends.

Part 12 are a pair of upright bars rigidly fixed with their upper ends as at 13 to bar 9, one forward of and the other rearward of seat 11. The forward one of these bars 12, at its lower end, is rigidly connected to a crankcase and gear housing 14 from which extends rearwardly a propeller-shaft tube 15 fixed at its rear part to the lower end of the other bar 12. Rearward of the latter bar a propeller 16 is fixed on the propeller shaft 17, said propeller 16 being rotated by rotary action of the cranks 18 carrying pedals 19 engaged by the feet of a rider 20 indicated in dotted lines in Fig. 2. Suitable gear means (not shown) are provided within housing 14 to impart rotary action to the propeller shaft. The rider is normally in upright position, his head, arms and chest normally above water level 21.

Part 22 is a cross arm in each float member 5 extending equi-distant from both sides and the outer ends formed preferably with a ring 22R engaged by an adjustable strap 23, there being one strap at each side of the device connecting the front and rear rings 22R. Said strap may be padded as 23P for the rider to rest his elbow and forearm thereon while his hands grasp the front cross arm 22, one at each side of the front float 5 as in Fig. 2.

As the floats are pivotally mounted on their respective frame bars 6 it will be readily understood that the device is steered to right or left by simply manipulating the cross arm, for example as to dotted line positions shown in Fig. 1 to steer to the right.

In Fig. 3 the upper frame means connected to main frame bar 9 and including the float 5 are shown out of vertical alinement in dotted lines, showing the effect of waves on the floats but practically no effect on the parts weighted down by the rider, thus improving the stability of the device.

In Fig. 4, a two-seated, tandem form of my device is illustrated. It involves the use of three floats, additional side straps 23, uprights 6, an extended main seat bar 9, 2 seats 11, etc. The main bar 9 is preferably sectional and adjacent ends simply retained removably in a special collar 24.

The floats 5 may be loosely retained on their respective bars 6 by removable collars 25 on each said bar one above and one below the float.

It will now be readily understood that my device is readily taken apart or put together in single or multiple units, the various connections being readily disengaged without the use of special tools and all parts may be carried in a container, to or from a beach, all parts with the exception of the floats occupying only a small space when the device is collapsed. The adjustability of all parts provides for the device being made useful for large or small persons. A number of modifications in structural details, etc., may be embodied without departing from the scope and spirit of the invention.

I claim:

1. In a collapsible water bicycle a pair of horizontally spaced elongated float members normally in alinement, a seat frame comprising a main horizontal bar, an upright bar extending vertically from said main bar and pivotally connected to the latter, each vertical bar extended centrally through a float and removably attached thereto, a cross arm member for each float and extending transversely from the sides thereof, flexible strap means connecting the outer ends of said cross arms at each side of the floats, a seat on said main horizontal bar, a secondary frame extending rigidly and downwardly from said main bar, a propeller mounted at the rear part of each said latter frame and pedal operated means in the forward part of said secondary frame arranged to rotate the propeller.

2. The structure specified in claim 1 in which said strap means are adjustable longitudinally, and padding means fixed on each strap intermediate its ends for the purpose described.

3. A swimming device of the class described comprising a plurality of elongated floats, and frame means comprising a vertical bar extending upward centrally through each float and a seat bar extending horizontally below said floats and pivotally connected to said vertical bars, said floats normally in alinement and adapted to be swiveled simultaneously on their upright bars for steering purposes, secondary frame means extending downwardly from the seat bar and between each adjacent pair of floats, a propeller mounted rearwardly of each of said latter frames and pedal-operated means for rotating each propeller.

4. The structure specified in claim 3 in which said frame means are detachably connected to their respective adjoined parts, the lower or secondary frame provided with rigid connection to the seat bar and the upright bars passing through the respective floats provided with journal means connecting them with the seat bar and means for retaining said latter connections pivotally on the seat bar in predetermined spaced relation.

5. A water-bicycle comprising a pair of elongated, normally alined floats, each tapered toward both ends, a frame suspended in the water by and below said floats, a propeller rotatably mounted in the lower part of said frame and pedal actuated means for rotating said propeller, steering arms on said floats projecting transversely from opposite sides thereof and means connecting the outer ends of said steering arms at both sides of the floats, a rider's seat mounted on the main frame above the pedals and below the floats.

In testimony whereof I affix my signature.

WILLIAM D. CLARK.